United States Patent
Zhao et al.

(10) Patent No.: US 9,806,922 B2
(45) Date of Patent: Oct. 31, 2017

(54) APPARATUS FOR ESTIMATING CHANNEL SPACING, APPARATUS FOR MONITORING WAVELENGTH, AND RECEIVER

(71) Applicant: FUJITSU LIMITED, Kawasaki (JP)

(72) Inventors: Ying Zhao, Beijing (CN); Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/007,891

(22) Filed: Jan. 27, 2016

(65) Prior Publication Data
US 2016/0226683 A1    Aug. 4, 2016

(30) Foreign Application Priority Data
Jan. 30, 2015   (CN) .......................... 2015 1 0050258

(51) Int. Cl.
*H04B 10/08*   (2006.01)
*H04L 27/00*   (2006.01)
*H04B 10/079*   (2013.01)

(52) U.S. Cl.
CPC ... *H04L 27/0006* (2013.01); *H04B 10/07955* (2013.01); *H04B 10/07957* (2013.01)

(58) Field of Classification Search
CPC .................... H04B 10/07955; H04B 10/07957
See application file for complete search history.

(56) References Cited

U.S. PATENT DOCUMENTS

| | | | |
|---|---|---|---|
| 2002/0021464 A1* | 2/2002 | Way | H04B 10/50 398/79 |
| 2013/0040577 A1* | 2/2013 | Hochstedler | H04W 16/14 455/62 |
| 2014/0161052 A1* | 6/2014 | Kazmi | H04L 5/0041 370/329 |
| 2014/0286637 A1* | 9/2014 | Kikuchi | H04J 14/0212 398/48 |
| 2016/0183268 A1* | 6/2016 | Albano | H04L 12/2634 370/252 |

* cited by examiner

*Primary Examiner* — Dzung Tran
(74) *Attorney, Agent, or Firm* — Staas & Halsey LLP (57) ABSTRACT

An apparatus for estimating channel spacing, an apparatus for monitoring wavelength and a receiver where the apparatus for estimating channel spacing includes: a measuring unit configured to measure a spectrum gap width according to spectrum information of a received signal; and a determining unit configured to determine channel spacing by using the spectrum gap width according to a predefined corresponding relationship between channel spacing and spectrum gap width. And in this application, the measuring unit may determine reference power according to a predefined reference power level, and take a frequency difference between two frequency points in a left or right gap of a central channel in the spectrum information of the received signal corresponding to the reference power as the spectrum gap width. With this application, accuracy of wavelength monitoring may be improved.

17 Claims, 7 Drawing Sheets

APPARATUS FOR ESTIMATING CHANNEL SPACING, APPARATUS FOR MONITORING WAVELENGTH, AND RECEIVER

CROSS-REFERENCE TO RELATED APPLICATIONS

This application relates to the subject matter of the Chinese patent application for invention, Application No. 201510050258.7, filed with Chinese State Intellectual Property Office on Jan. 30, 2015. The disclosure of this Chinese application is considered part of and is incorporated by reference in the disclosure of this application.

BACKGROUND

1. Field

The present disclosure relates to the field of a multicarrier optical communication system, and in particular to an apparatus for estimating channel spacing, an apparatus for monitoring wavelength and a receiver.

2. Description of the Related Art

In a multicarrier optical communication system, subcarrier data are modulated in several optical carriers independent of each other. Under an ideal condition, wavelengths of lasers are stable, and spacing of wavelengths of the carriers is constant. In a practical system, as wavelengths of lasers are influenced by variation of driving currents, temperature fluctuation, and resonant cavity aging, etc., output carrier wavelengths drift in a certain range. Such indefinite variation of wavelengths brings relatively large influence to the multicarrier optical communication system, which is mainly embodied in: 1) occurrence of neighboring channel crosstalk between channels of the subcarriers; and 2) edge subcarriers being subjected to more severe distortion.

An effective wavelength monitoring method is an important means for overcoming drift of laser wavelengths. On a basis of monitoring wavelengths, the wavelengths of the lasers may be adjusted with respect to feedback, so as to avoid variation of wavelengths to a great extent, thereby achieving locking of wavelengths of the subcarriers. Stable wavelengths of subcarriers can not only avoid neighboring channel crosstalk, but also make spectrum resources being used more efficiently, thereby improving spectrum utilization.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

It can be seen that wavelength monitoring is a basis for achieving locking of subcarrier wavelength, and is also an effective means for further optimizing a multicarrier optical communication system. In a process of achieving wavelength monitoring, introduction of extra hardware overhead is not expected, hence, attention is paid to a scheme in which wavelength monitoring based on digital signal processing is performed in a receiver.

This application provides an apparatus for estimating channel spacing, an apparatus for monitoring wavelength and a receiver, which are based on signal processing performed in an optical receiver, so as to obtain subcarrier spacing or wavelength information without introducing large complexity.

According to a first aspect of this application, there is provided an apparatus for estimating channel spacing in a multicarrier optical communication system, including:

a measuring unit configured to measure a spectrum gap width according to spectrum information of a received signal; and a determining unit configured to determine channel spacing by using the spectrum gap width according to a predefined corresponding relationship between channel spacing and spectrum gap width;

wherein, the measuring unit may determine reference power according to a predefined reference power level, and take a frequency difference between two frequency points in a left or right gap of a central channel in the spectrum information of the received signal corresponding to the reference power as the spectrum gap width.

According to a second aspect of this application, there is provided an apparatus for monitoring wavelength; wherein the apparatus for monitoring wavelength performs wavelength monitoring according to channel spacing estimated by the apparatus for estimating channel spacing as described above.

According to a third aspect of this application, there is provided a receiver, including the apparatus for estimating channel spacing as described above.

According to a fourth aspect of this application, there is provided a method for estimating channel spacing in a multicarrier optical communication system, including:

measuring a spectrum gap width according to spectrum information of a received signal; and determining channel spacing by using the spectrum gap width according to a predefined corresponding relationship between channel spacing and spectrum gap width.

An advantage of the embodiments of the present disclosure exists in that with this application, accuracy of estimation of subcarrier spacing may be improved, and wavelength monitoring errors may be reduced, without introduction of hardware overhead.

With reference to the following description and drawings, the particular embodiments of the present disclosure are disclosed in detail, and the principles of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the exemplary embodiments of the present disclosure, and are used for setting forth the principles of the present disclosure together with the description. It is easy and understood that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In this application, spectrum information obtained by an optical receiver is used to estimate spectrum gap width of a receiver, so as to achieve judgment of subcarrier spacing. In this application, by performing necessary processing on the above spectrum information, accuracy of spectrum gap estimation may be improved. Furthermore, wavelength monitoring may be performed based on the estimated subcarrier spacing, thereby improving accuracy of the wavelength monitoring.

Particular embodiments of this application shall be described below with reference to the accompanying drawings.

Embodiment 1

Figure 1:
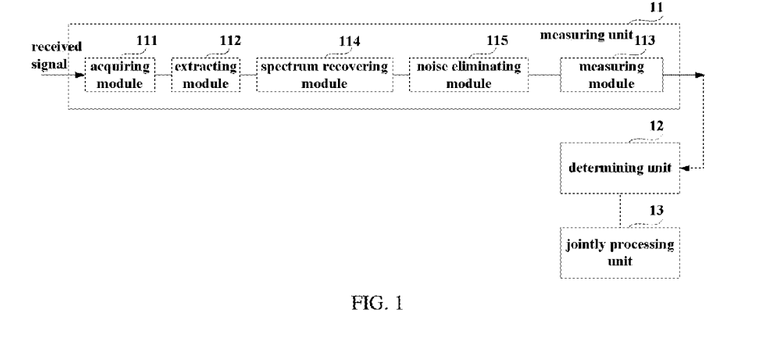
FIG. 1 is a schematic diagram of a structure of the apparatus for estimating channel spacing of an embodiment.

An embodiment of this application provides an apparatus for estimating channel spacing in a multicarrier optical communication system. FIG. 1 is a schematic diagram of a structure of the apparatus. Referring to FIG. 1, the apparatus includes: a measuring unit 11 and a determining unit 12; wherein, the measuring unit 11 measures a spectrum gap width according to spectrum information of a received signal;

and the determining unit 12 determines channel spacing by using the spectrum gap width according to a predefined corresponding relationship between channel spacing and spectrum gap width.

Figure 2:
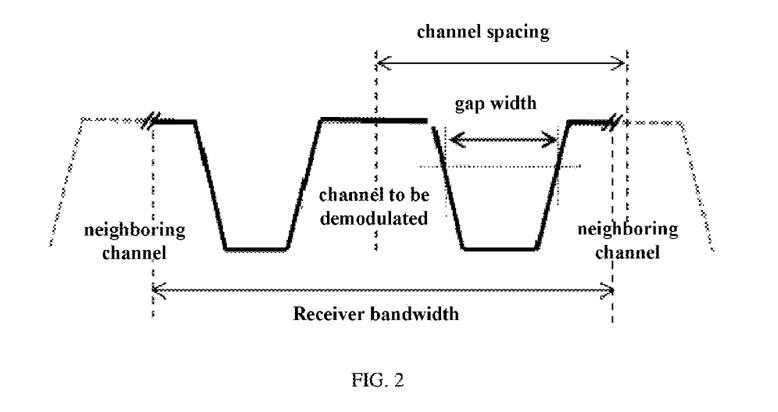
FIG. 2 is a schematic diagram of a basis principle of channel spacing estimation of the embodiment.

FIG. 2 is a schematic diagram of a basis principle of channel spacing estimation of this embodiment. As shown in FIG. 2, within a bandwidth range of an optical receiver, besides an intermediate channel (referred to as a central channel, the same blow) needing to be demodulated, left and right part neighboring channel information received simultaneously is also included. As the bandwidth of the optical receiver is limited, only part of the left and right neighboring channel information is received, which is represented by a range shown by broadened solid lines in the figure. Within this range, as a neighboring spectrum is incomplete, spacing between central wavelengths of two channels cannot be judged directly. In this embodiment, channel spacing may be indirectly scaled by using a method for measuring a spectrum gap width between neighboring channels. As shown in FIG. 2, the spectrum gap width is defined as: a distance from a negative slope edge of a local channel spectrum to a positive slope edge of a neighboring channel at a certain power level. As existence of the spectrum gap may always be ensured in the range of the bandwidth of the receiver, for a specific received spectrum, the channel spacing may always be reflected by the gap width. This application is based on such a principle, and the channel spacing is determined by measuring a spectrum gap width.

In an implementation of the measuring unit 11, as shown in FIG. 1, the measuring unit 11 includes an acquiring module 111, an extracting module 112 and a measuring module 113; wherein, the acquiring module 111 is configured to acquire the received signal;

the extracting module 112 is configured to extract spectrum information from the received signal acquired by the acquiring module 111;

and the measuring module 113 is configured to determine reference power according to a predefined reference power level, and take a frequency difference between two frequency points in a left or right gap of a central channel in the spectrum information of the received signal corresponding to the reference power as the spectrum gap width.

In this embodiment, the acquiring module 111 may acquire the received signal from the optical receiver. The received signal may be a sampling sequence of M☐N points extracted from the receiver, its spectrum being as shown on the left of FIG. 3. This spectrum may reflect a channel shape of a subcarrier. However, as the randomness of data signal, the spectrum fluctuates to a great extent. As only envelope information of a spectrum is needed in gap width measurement, random data of the spectrum information should be eliminated.

In this embodiment, the extracting module 112 may use an averaging method to eliminate influence of random data, and at the same time, it may also use a method of convoluting with a window function to achieve smoothing.

Figure 3:
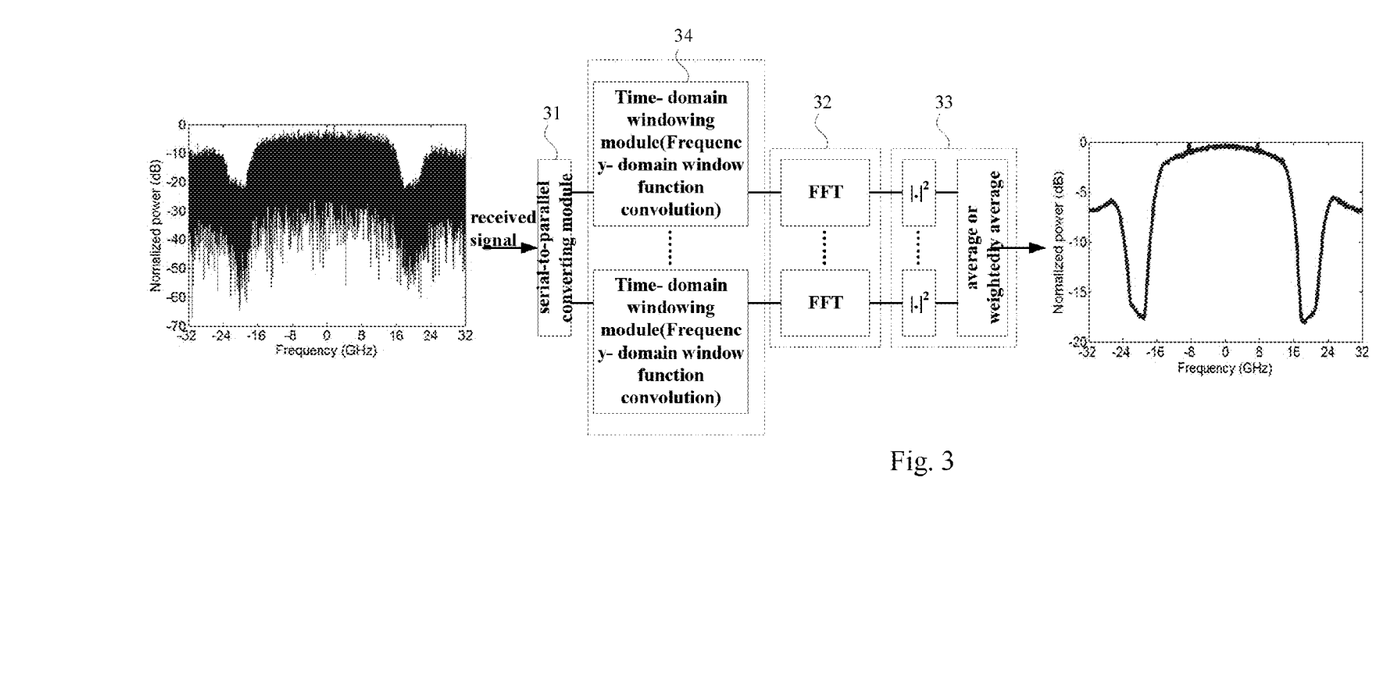
FIG. 3 is a schematic diagram of extracting spectrum information from a received signal.

FIG. 3 is a schematic diagram of an implementation of the extracting module 112. As shown in the middle of FIG. 3, in this implementation, the extracting module 112 may include a serial-to-parallel converting module 31, a Fourier transform module 32 and a calculating module 33. The serial-to-parallel converting module 31 is configured to divide the received signal into a predefined number of sections, there exist overlapping between sections, or there exist no overlapping between sections; for example, the above sampling sequence of M☐N points are serially-parallelly converted into M sections of subsequences, each section having N points. The Fourier transform module 32 is configured to perform Fourier transform on each section of signal, so as to obtain a spectrum of each section of signal, that is, convert each section of signal from a time domain into a frequency domain; for example, fast Fourier transform is performed on each section of subsequence, so as to obtain its spectrum. And the calculating module 33 is configured to calculate a modular square of the spectrum of each section of signal, so as to obtain a power spectrum of each section of signal, thereby reflecting a power spectrum shape in the frequency domain, and average or weighted average power spectra of all sections of signals, so as to obtain an averaged power spectrum of all sections of signals as an extracted spectrum information. In this way, random information in each section of signal may be effectively suppressed after the average, with an outputted smooth spectrum being as shown in the right of FIG. 3.

In this implementation, alternatively, the extracting module 112 may further include a time-domain windowing module 34, as shown in FIG. 3. The time-domain windowing module 34 is located after the serial-to-parallel converting module 31 and before the Fourier transform module 32, and is configured to directly perform window function convolution on the spectrum of each section of signal. For example, the spectrum of each section of signal is convoluted with a specific window function, so as to achieve an effect of spectrum smoothing.

In this implementation, after the spectrum information of the received signal is obtained, the measuring module 113 may measure the spectrum gap width according to the spectrum information.

Figure 4:
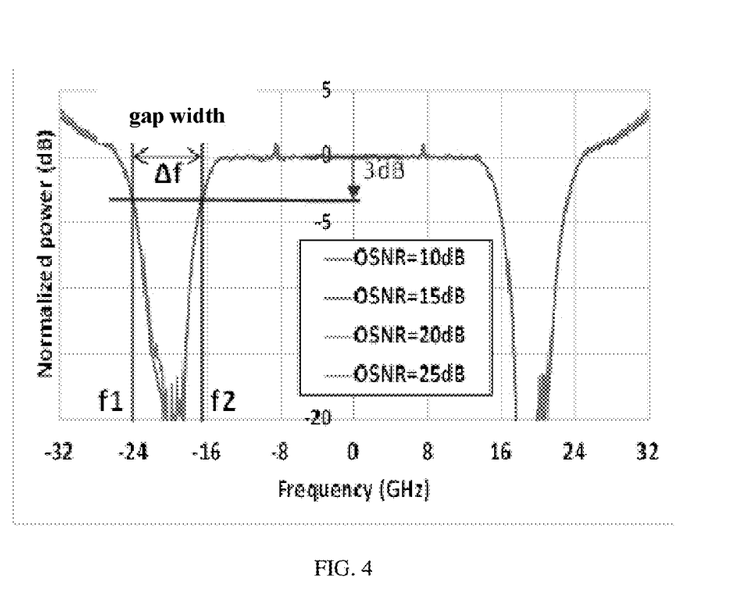
FIG. 4 is a schematic diagram of measuring a spectrum gap width according to the spectrum information.

FIG. 4 is a schematic diagram of an implementation of the measuring module 113. In this implementation, the spectrum shown in FIG. 4 may be directly extracted from the received signal, and may also be a spectrum obtained by processing the spectrum extracted from the received signal. For example, spectrum recovery, and noise elimination, etc., are performed on the extracted spectrum, which shall be described below.

In this embodiment, as shown in FIG. 4, in order to measure the spectrum gap width, a reference power level needs to be selected first. In an implementation, a power level 3 dB lower than a power value of the flat area of the central channel may be selected as the reference power level. It should be noted that 3 dB is not a compulsory value, other numerical values may also be selected in this embodiment, and such numerical values are not limited in this embodiment. After the reference power level is selected, frequency points f1 and f2 in the left or right gap corresponding to this power may be determined. After the frequency points f1 and f2 are found, a value of Δf=|f2−f1| is calculated and is taken as the spectrum gap width.

In this embodiment, as shown in FIG. 2, there is a one-to-one corresponding relationship between the spectrum gap width and the channel spacing, and the relationship between the spectrum gap width and the channel spacing may be predefined in this embodiment. The determining unit 12 may indirectly obtain the channel spacing according to the relationship after obtaining the spectrum gap width by the measuring unit 11. Obtaining the channel spacing means that a basis for wavelength monitoring is obtained.

In another implementation of the measuring unit 11, as shown in FIG. 1, the measuring unit 11 may further include:

a spectrum recovering module 114 configured to perform spectrum recovery on an input signal, and take a spectrum recovered signal as an input signal of a next step of processing.

As shown in FIG. 1, in this embodiment, the spectrum recovering module 114 is located after the extracting module 112, its input is the spectrum information extracted by the extracting module 112, and its output is input of a next step of processing. In this implementation, the spectrum recovering unit 114 obtains the spectrum recovered signal by performing spectrum recovery on the spectrum information extracted by the extracting module 112, and takes it as input of a next step of processing. If the next step of processing is the measuring module 113, the measuring module 113 measures the spectrum gap width according to the spectrum outputted by the spectrum recovering module 114.

Figure 5:
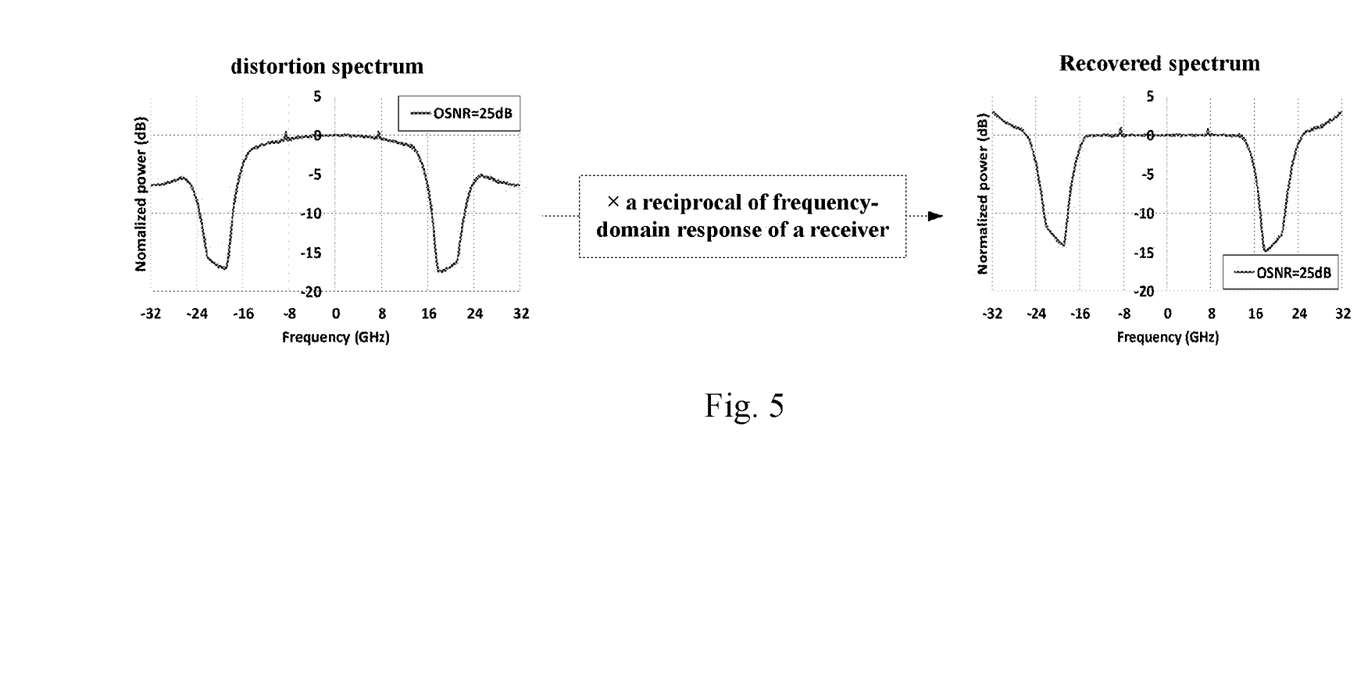
FIG. 5 is a schematic diagram of performing spectrum recovery on a distortion spectrum.

FIG. 5 is a schematic diagram of an implementation of the spectrum recovering module 114. In this implementation, the spectrum information extracted by the extracting module 112, i.e. a smoothed spectrum with influence of random data being eliminated, is shown in the left spectrum diagram in FIG. 5. As a spectrum response of the receiver is not flat, it will result in that distortion of a spectrum of a neighboring channel is relatively severe. If no spectrum recovery is performed, it will result in relatively large gap width estimation deviation.

In this implementation, an operation of the spectrum recovery may be performed on a smoothed distortion spectrum by the spectrum recovering module 114, in particular, by multiplying amplitude of each frequency point of the distortion spectrum by a correction coefficient; wherein, the correction coefficient may be a reciprocal of response amplitude of a receiver at each frequency point, and may also be other values. After this operation, a recovered spectrum is as shown in the right spectrum diagram in FIG. 5, and the spectrum of the central channel is also smoothed while power of the neighboring channel is improved obviously. And the accuracy of estimation of the gap width by using such a spectrum will be outstandingly improved.

In this implementation, there are a pair of pilot signals at positions of ±8 GHz in the left and right spectrum diagrams in FIG. 5, which are not necessary in this embodiment, but have no effect on the accuracy of the estimation of the gap.

In still another implementation of the measuring unit 11, the measuring unit 11 may further include:

a noise eliminating module 115 configured to determine noise floor power of the input signal, and subtract the noise floor power at each frequency point of the input signal, so as to obtain a noise eliminated signal as an input signal of a next step of processing.

As shown in FIG. 1, in this embodiment, the noise eliminating module 115 is located after the spectrum recovering module 114, its input is the spectrum recovered by the spectrum recovering module 114, and its output is the measuring module 113; that is, the measuring module 113 performs the spectrum gap measurement based on the noise eliminated spectrum. However, this embodiment is not limited thereto, and in particular implementation, the noise eliminating module 115 may also be located before the spectrum recovering module 114 and after the extracting module 112; in this case, its input is the spectrum extracted by the extracting module 112, and its output is the input of the spectrum recovering module 114. And the noise eliminating module 115 performs noise elimination on the spectrum extracted by the extracting module 112, and outputs the noise eliminated spectrum to the spectrum recovering module 114.

Figure 6:
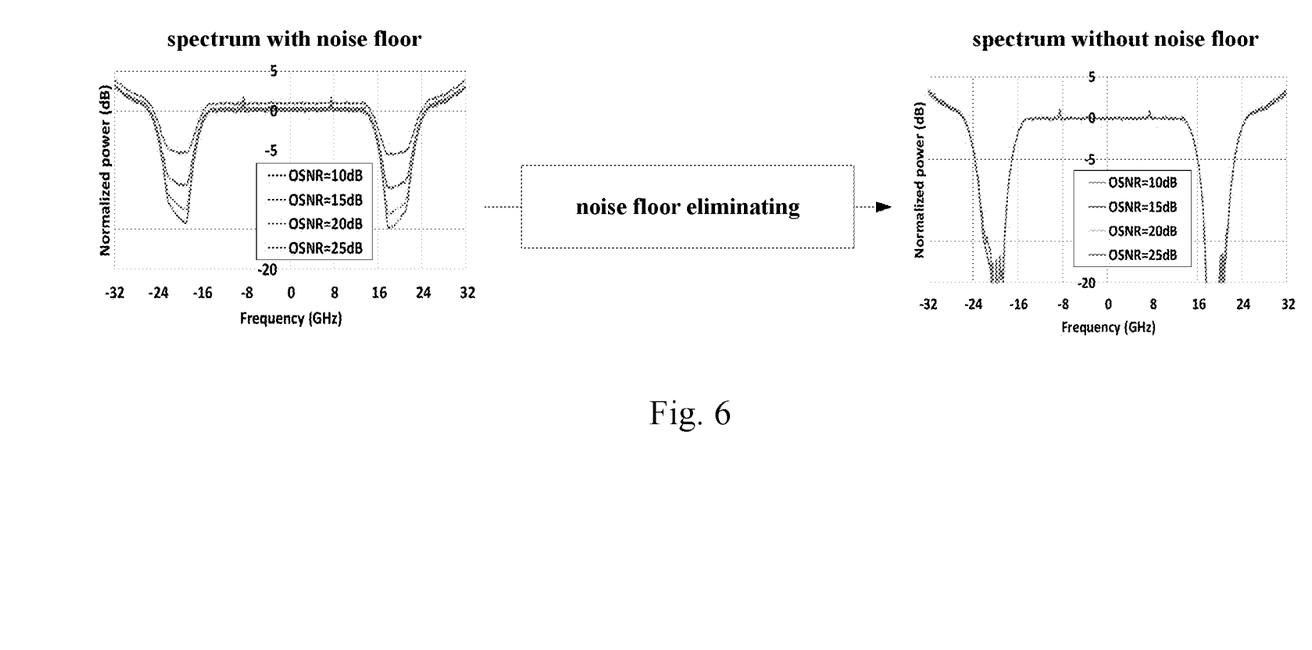
FIG. 6 is a schematic diagram of performing noise elimination on a spectrum with a noise.

FIG. 6 is a schematic diagram of a structure of an implementation of the noise eliminating module 115. In this implementation, what is shown in the left spectrum diagram is a spectrum diagram of a receiver at different noise levels. It can be seen that different noise levels result in occurrence of relatively large deviation of amplitude of floor of spectrum gap, and such deviation will also influence the accuracy of the estimation of the gap width. In order to avoid phenomenon of correlation of an estimated value of a gap and a noise level, the noise eliminating module 115 is used in this embodiment to perform noise elimination on the noise floor before the gap estimation. In particular, a lowest point in the spectrum amplitude is found and is taken as noise floor power, and then the noise floor power is subtracted at each frequency point (linear subtraction). The noise floor eliminated spectrum is as shown in the right spectrum diagram in FIG. 6. It can be seen that different noise levels will not influence the spectrum shape; hence, the estimated value of the gap will not rely on the noise levels any longer.

In an implementation of this embodiment, the apparatus for estimating channel spacing may further include a jointly processing unit 13, the jointly processing unit 13 is configured to receive reference information transmitted by a neighboring receiver, and adjust the spectrum gap width determined by the determining unit 12 according to the reference information.

This embodiment achieves judgment of subcarrier spacing by performing spectrum gap estimation by using the spectrum information obtained by the optical receiver, and by necessary processing of the spectrum information, the accuracy of the subcarrier spacing estimation is improved without introducing hardware overhead, thereby reducing wavelength monitoring errors, and providing instructions to productize of wavelength control modules.

Embodiment 2

An embodiment of the present disclosure further provides an apparatus for monitoring wavelength, the apparatus for monitoring wavelength is configured to perform wavelength monitoring according to channel spacing estimated by the apparatus for estimating channel spacing described in Embodiment 1. A particular process and method of monitoring is not limited in this embodiment, the prior art may be referred to, and any available implementable manner may be used. For example, once an estimation result of the channel spacing is obtained, a wavelength difference will be obtained, and the apparatus for monitoring wavelength may perform wavelength monitoring according to the wavelength difference and an absolute value of the wavelength.

As the apparatus for monitoring wavelength of this embodiment performs wavelength monitoring according to the channel spacing estimated by the apparatus for estimating channel spacing described in Embodiment 1, accuracy of the subcarrier gap estimation is improved without introducing hardware overhead, and wavelength monitoring errors may be reduced.

Embodiment 3

An embodiment of the present disclosure further provides a coherent optical receiver in a multicarrier optical communication system, including the apparatus for estimating channel spacing described in Embodiment 1.

Figure 7:
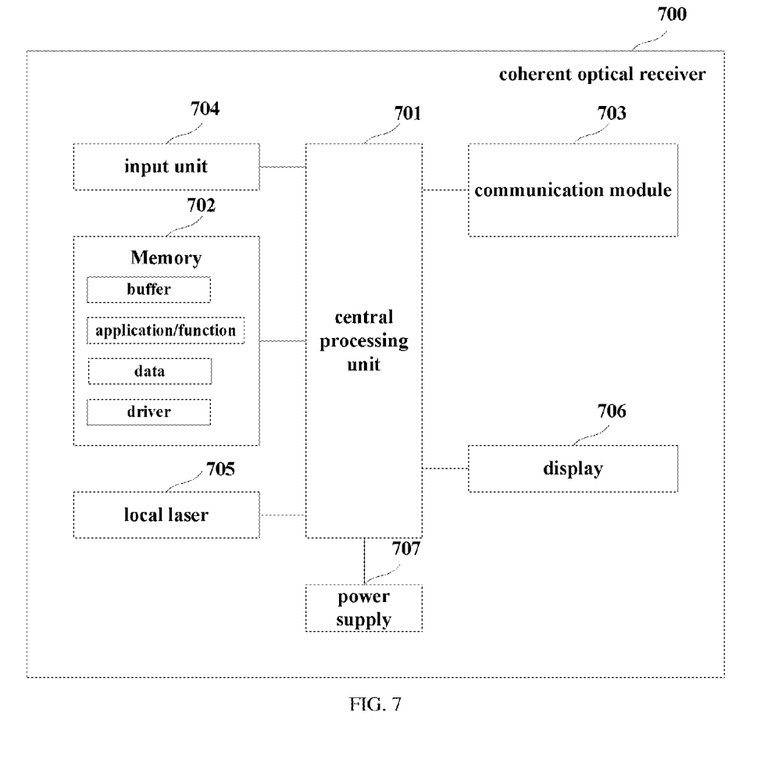
FIG. 7 is a schematic diagram of a structure of the coherent optical receiver of an embodiment.

FIG. 7 is a schematic diagram of a structure of the coherent optical receiver of this embodiment. As shown in FIG. 7, the coherent optical receiver 700 may include a central processing unit (CPU) 701 and a memory 702, the memory 702 being coupled to the central processing unit 701. It should be noted that this figure is exemplary only, and other types of structures may be used to supplement or replace this structure for the realization of telecommunications functions or other functions.

In an implementation, functions of the apparatus for estimating channel spacing described in Embodiment 1 may be incorporated into the central processing unit 701. In this implementation, the central processing unit 701 may be configured to measure a spectrum gap width according to spectrum information of a received signal, and determine channel spacing by using the spectrum gap width according to a predefined corresponding relationship between channel spacing and spectrum gap width.

Alternatively, the central processing unit 701 may further be configured to acquire the received signal, extract spectrum information from the acquired received signal, and determine reference power according to a predefined reference power level, and take a frequency difference between two frequency points in a left or right gap of a central channel in the spectrum information corresponding to the reference power as the spectrum gap width.

Alternatively, the central processing unit 701 may further be configured to divide the received signal into a predefined number of sections, perform Fourier transform on each section of signal, so as to obtain a spectrum of each section of signal, and calculate a modular square of the spectrum of each section of signal, so as to obtain a power spectrum of each section of signal, and average or weighted average power spectra of all sections of signals, so as to obtain an averaged power spectrum of all sections of signals as the spectrum information.

In this implementation, after dividing the received signal into the predefined number of sections, window function convolution may be performed on the spectrum of each section of signal first, and then the above Fourier transform is performed, so as to achieve an effect of spectrum smoothing.

Alternatively, the central processing unit 701 may further be configured to perform spectrum recovery on an input signal, and take a spectrum recovered signal as an input signal of a next step of processing. In this implementation, the spectrum recovery may be performed on the input signal by multiplying amplitude of each frequency point in the spectrum of the input signal by a correction coefficient. And in this implementation, the correction coefficient may be a reciprocal of response amplitude of the receiver at each frequency point.

Alternatively, the central processing unit 701 may further be configured to determine noise floor power of the input signal, and subtract the noise floor power at each frequency point of the input signal, so as to obtain a noise eliminated signal as an input signal of a next step of processing.

Alternatively, the central processing unit 701 may further be configured to receive reference information transmitted by a neighboring receiver, and adjust the spectrum gap width according to the reference information.

In another implementation, the apparatus for estimating channel spacing and the central processing unit 701 may be configured separately. For example, the apparatus for estimating channel spacing may be configured as a chip connected to the central processing unit 701, with functions of the apparatus for estimating channel spacing being realized under control of the central processing unit 701.

As shown in FIG. 7, the coherent optical receiver 700 may further include a communication module 703, an input unit 704, a local laser 705, a display 706, and a power supply 707. It should be noted that the coherent optical receiver 700 does not necessarily include all the parts shown in FIG. 7; furthermore, the coherent optical receiver 700 may include components not shown in FIG. 7, and the prior art may be referred to.

As shown in FIG. 7, the central processing unit 701 is sometimes referred to as a controller or control, and may include a microprocessor or other processor devices and/or logic devices. The central processing unit 701 receives input and controls operations of every component of the coherent optical receiver 700.

In this embodiment, the memory 702 may be, for example, one or more of a buffer memory, a flash memory, a hard drive, a mobile medium, a volatile memory, a nonvolatile memory, or other suitable devices, which may store predefined or preconfigured information, and may further store a program executing related information. And the central processing unit 701 may execute the program stored in the memory 702, so as to realize information storage or processing, etc. Functions of other parts are similar to those of the prior art, which shall not be described herein any further. The parts of the coherent optical receiver 700 may be realized by specific hardware, firmware, software, or any combination thereof, without departing from the scope of the present disclosure.

As the coherent optical receiver of this embodiment uses the apparatus for estimating channel spacing of an embodiment of this application to estimate channel spacing, and further performs wavelength monitoring according to the estimated channel spacing, accuracy of the subcarrier gap estimation is improved without introducing hardware overhead, and wavelength monitoring errors may be reduced.

Embodiment 4

Figure 8:
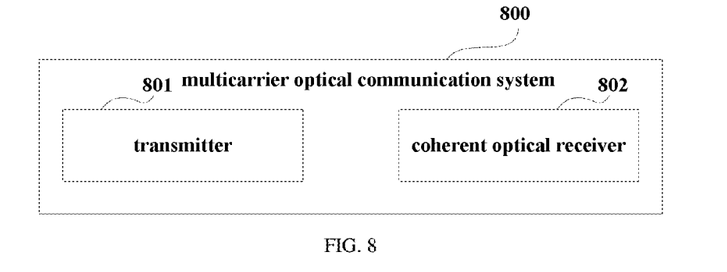
FIG. 8 is a schematic diagram of topology of the multicarrier optical communication system of an embodiment.

An embodiment of the present disclosure further provides a multicarrier optical communication system. FIG. 8 is a schematic diagram of the system. As shown in FIG. 8, the system 800 includes a transmitter 801 and a coherent optical receiver 802. In this embodiment, the coherent optical receiver 802 may be carried out by the coherent optical receiver 700 in Embodiment 3, the contents of which being incorporated herein, and being not going be described herein any further.

With the multicarrier optical communication system provided by the embodiment of the present disclosure, accuracy of the subcarrier gap estimation is improved without introducing hardware overhead, and wavelength monitoring errors may be reduced.

Embodiment 5

Figure 9:
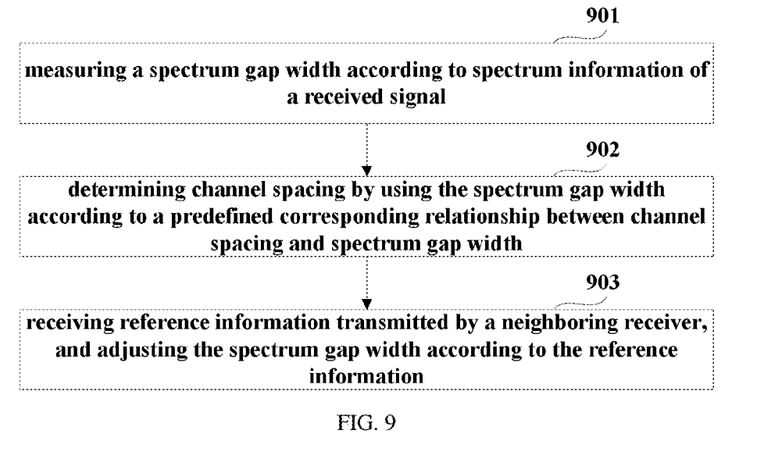
FIG. 9 is a flowchart of the method for estimating channel spacing of an embodiment.

An embodiment of the present disclosure further provides a method for estimating channel spacing. FIG. 9 is a flowchart of the method. As principles of the method for solving problems is similar to that of the apparatus in Embodiment 1, the implementation of the apparatus in Embodiment 1 is referred to for the implementation of this method, with the identical parts being not going to be described herein any further.

Referring to FIG. 9, the method includes:

step 901: measuring a spectrum gap width according to spectrum information of a received signal; and step 902: determining channel spacing by using the spectrum gap width according to a predefined corresponding relationship between channel spacing and spectrum gap width.

In an implementation, step 901 may include:

S1: acquiring a received signal;

S2: extracting spectrum information from the acquired received signal; and

S3: determining reference power according to a predefined reference power level, and taking a frequency difference between two frequency points in a left or right gap of a central channel in the spectrum information of the received signal corresponding to the reference power as the spectrum gap width.

In this implementation, S2 may include:

S21: dividing the received signal into a predefined number of sections;

S22: performing Fourier transform on each section of signal, so as to obtain a spectrum of each section of signal;

S23: calculating a modular square of the spectrum of each section of signal, so as to obtain a power spectrum of each section of signal, and averaging or weighted averaging power spectra of all sections of signals, so as to obtain an averaged power spectrum of all the sections of signals as the spectrum information.

In this implementation, after S21 and before S22, window function convolution may be performed on the spectrum of each section of signal, so as to achieve an effect of smoothing processing.

In an implementation, step 901 may further include:

S4: performing spectrum recovery on an input signal, and taking the spectrum recovered signal as an input signal of a next step of processing.

In this implementation, S4 is optional, and may be executed after S2, and may also be executed before S2.

In this implementation, the spectrum recovery may be performed on the input signal by multiplying amplitude of each frequency point in the spectrum of the input signal by a correction coefficient.

In this implementation, the correction coefficient may be a reciprocal of response amplitude of a receiver at each frequency point; however, this embodiment is not limited thereto.

In an implementation, step 901 may further include:

S5: determining noise floor power of the input signal, and subtracting the noise floor power at each frequency point of the input signal, so as to obtain a noise eliminated signal and take it as an input signal of a next step of processing.

In this implementation, S5 is optional, and may be executed after S2, and may also be executed before S2, and may be executed after S4, and may also be executed before S4.

In an implementation, the method may further include:

S903: receiving reference information transmitted by a neighboring receiver, and adjusting the spectrum gap width according to the reference information.

By performing the channel spacing estimation by using the method of this embodiment, accuracy of the subcarrier gap estimation is improved without introducing hardware overhead, and wavelength monitoring errors may be reduced.

An embodiment of the present disclosure further provides a computer-readable program, wherein when the program is executed in an apparatus for estimating channel spacing or a receiver, the program enables a computer to carry out the method as described in Embodiment 5 in the apparatus for estimating channel spacing or the receiver.

An embodiment of the present disclosure further provides a storage medium in which a computer-readable program is stored, wherein the computer-readable program enables a computer to carry out the method as described in Embodiment 5 in an apparatus for estimating channel spacing or a receiver.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

For the implementation of the present disclosure containing the above embodiments, following supplements are further disclosed.

Supplement 1. A method for estimating channel spacing, including:
measuring a spectrum gap width according to spectrum information of a received signal; and
determining channel spacing by using the spectrum gap width according to a predefined corresponding relationship between channel spacing and spectrum gap width.

Supplement 2. The method according to supplement 1, wherein the measuring a spectrum gap width according to spectrum information of a received signal includes:
acquiring the received signal;
extracting the spectrum information from the acquired received signal; and
determining reference power according to a predefined reference power level, and taking a frequency difference between two frequency points in a left or right gap of a central channel in the spectrum information corresponding to the reference power as the spectrum gap width.

Supplement 3. The method according to supplement 2, wherein the extracting spectrum information from the acquired received signal includes:
dividing the received signal into a predefined number of sections;
performing Fourier transform on each section of signal, so as to obtain a spectrum of each section of signal; and
calculating a modular square of the spectrum of each section of signal, so as to obtain a power spectrum of each section of signal, and averaging or weightedly averaging power spectra of all sections of signals, so as to obtain an averaged power spectrum of all the sections of signals as the spectrum information.

Supplement 4. The method according to supplement 3, wherein after dividing the received signal into a predefined number of sections, the method further includes:
performing window function convolution on the spectrum of each section of signal.

Supplement 5. The method according to supplement 2, wherein the measuring a spectrum gap width according to spectrum information of a received signal further includes:
performing spectrum recovery on an input signal, and taking the spectrum recovered signal as an input signal of a next step of processing.

Supplement 6. The method according to supplement 5, wherein the spectrum recovery is performed on the input signal by multiplying amplitude of each frequency point in the spectrum of the input signal by a correction coefficient.

Supplement 7. The method according to supplement 6, wherein the correction coefficient is a reciprocal of response amplitude of a receiver at each frequency point.

Supplement 8. The method according to supplement 2, wherein the measuring a spectrum gap width according to spectrum information of a received signal further includes:
determining noise floor power of the input signal, and subtracting the noise floor power at each frequency point of the input signal, so as to obtain a noise eliminated signal and take it as an input signal of a next step of processing.

Supplement 9. The method according to supplement 1, wherein the method further includes:
receiving reference information transmitted by a neighboring receiver, and adjusting the spectrum gap width according to the reference information.

Supplement 10. An apparatus for estimating channel spacing in a multicarrier optical communication system, including:
a measuring unit configured to measure a spectrum gap width according to spectrum information of a received signal; and
a determining unit configured to determine channel spacing by using the spectrum gap width according to a predefined corresponding relationship between channel spacing and spectrum gap width.

Supplement 11. The apparatus according to supplement 10, wherein the measuring unit includes:
an acquiring module configured to acquire the received signal;
an extracting module configured to extract the spectrum information from the received signal acquired by the acquiring module; and
a measuring module configured to determine reference power according to a predefined reference power level, and take a frequency difference between two frequency points in a left or right gap of a central channel in the spectrum information of the received signal corresponding to the reference power as the spectrum gap width.

Supplement 12. The apparatus according to supplement 11, wherein the extracting module includes:
a serial-to-parallel converting module configured to divide the received signal into a predefined number of sections;
a Fourier transform module configured to perform Fourier transform on each section of signal, so as to obtain a spectrum of each section of signal; and
a calculating module configured to calculate a modular square of the spectrum of each section of signal, so as to obtain a power spectrum of each section of signal, and average or weightedly average power spectra of all sections of signals, so as to obtain an averaged power spectrum of all sections of signals as the spectrum information.

Supplement 13. The apparatus according to supplement 12, wherein the extracting module further includes:
a time-domain windowing module configured to perform window function convolution on the spectrum of each section of signal.

Supplement 14. The apparatus according to supplement 12, wherein the measuring unit further includes:
a spectrum recovering module configured to perform spectrum recovery on an input signal, and take the spectrum recovered signal as an input signal of a next step of processing.

Supplement 15. The apparatus according to supplement 14, wherein the spectrum recovering module performs spectrum recovery on the input signal by multiplying amplitude of each frequency point in the spectrum of the input signal by a correction coefficient.

Supplement 16. The apparatus according to supplement 15, wherein the correction coefficient is a reciprocal of response amplitude of a receiver at each frequency point.

Supplement 17. The apparatus according to supplement 12, wherein the measuring unit further includes:
a noise eliminating module configured to determine noise floor power of the input signal, and subtract the noise floor power at each frequency point of the input signal, so as to obtain a noise eliminated signal and take it as an input signal of a next step of processing.

Supplement 18. The apparatus according to supplement 10, wherein the apparatus further includes:
a jointly processing unit configured to receive reference information transmitted by a neighboring receiver, and adjust the spectrum gap width according to the reference information.

Supplement 19. An apparatus for monitoring wavelength, wherein, the apparatus for monitoring wavelength is configured to perform wavelength monitoring according to channel spacing estimated by the apparatus for estimating channel spacing as described in any one of supplements 10-18.

Supplement 20. A receiver, including the apparatus for estimating channel spacing as described in any one of supplements 10-18.

What is claimed is:

1. An apparatus for estimating channel spacing in a multicarrier optical communication system, comprising:
a measuring unit configured to measure a spectrum gap width according to spectrum information of a received signal; and
a determining unit configured to determine channel spacing by using the spectrum gap width according to a predefined corresponding relationship between the channel spacing and the spectrum gap width,
wherein the measuring unit comprises:
an acquiring module configured to acquire the received signal;
an extracting module configured to extract the spectrum information from the received signal acquired by the acquiring module; and
a measuring module configured to determine a reference power according to a predefined reference power level, and set a frequency difference between two frequency points in one of a left and right gap of a central channel in the spectrum information of the received signal corresponding to the reference power as the spectrum gap width.

2. The apparatus according to claim 1, wherein the extracting module comprises:
a serial-to-parallel converting module configured to divide the received signal into a predefined number of sections;
a Fourier transform module configured to perform Fourier transform on each section of the received signal to obtain an initial spectrum of each section of the received signal; and
a calculating module configured to calculate a modular square of the initial spectrum of each section of the received signal to obtain a power spectrum of each section of the received signal, and one of an average and a weighted average power spectra of all sections of received signals to obtain an averaged power spectrum of all sections of the received signals as the spectrum information.

3. The apparatus according to claim 2, wherein the extracting module further includes:
a time-domain windowing module configured to perform window function convolution on the initial spectrum of each section of the received signal.

4. The apparatus according to claim 1, wherein the measuring unit further comprises:
a spectrum recovery module configured to perform spectrum recovery on an input signal, and take use a spectrum recovered signal as a next input signal of a next step of processing.

5. The apparatus according to claim 4, wherein the spectrum recovery module performs spectrum recovery on the input signal by multiplying an amplitude of each frequency point in an input signal spectrum of the input signal by a correction coefficient.

6. The apparatus according to claim 5, wherein the correction coefficient is a reciprocal of a response amplitude of a receiver at each frequency point.

7. The apparatus according to claim 1, wherein the measuring unit further comprises:
a noise eliminating module configured to determine a noise floor power of the input signal, and subtract the noise floor power at each frequency point from an input signal to obtain a noise eliminated signal and set the noise eliminated signal as a next input signal of a next step of processing.

8. The apparatus according to claim 1, wherein the apparatus further comprises:
a joint processing unit configured to receive reference information transmitted by a neighboring receiver, and adjust the spectrum gap width according to the reference information.

9. A method for estimating channel spacing, including:
measuring a spectrum gap width according to spectrum information of a received signal; and
determining channel spacing by using the spectrum gap width according to a predefined corresponding relationship between channel spacing and the spectrum gap width,
wherein the measuring the spectrum gap width according to the spectrum information of the received signal includes:
acquiring the received signal;
extracting the spectrum information from the received signal; and
determining reference power according to a predefined reference power level, and setting a frequency difference between two frequency points in one of a left and right qap of a central channel in the spectrum information corresponding to the reference power level as the spectrum gap width.

10. The method according to claim 9, wherein the extracting spectrum information from the acquired received signal includes:
dividing the received signal into a predefined number of sections;
performing Fourier transform on each section of the received signal to obtain an initial spectrum of each section of the received signal; and
calculating a modular square of the initial spectrum of each section of the received signal, to obtain a power spectrum of each section of the received signal, and one of averaging and weighted averaging power spectra of all sections of received signals to obtain an averaged power spectrum of all the sections of the received signals as the spectrum information.

11. The method according to claim 10, wherein after dividing the received signal into the predefined number of sections, the method further includes:
performing window function convolution on the initial spectrum of each section of the received signals.

12. The method according to claim 9, wherein the measuring the spectrum gap width according to the spectrum information of the received signal further includes:
performing spectrum recovery on an input signal, and a using spectrum recovered signal as a next input signal of a next step of processing.

13. The method according to claim 12, wherein the spectrum recovery is performed on the input signal by multiplying an amplitude of each frequency point in an input signal spectrum of the input signal by a correction coefficient.

14. The method according to claim 13, wherein the correction coefficient is a reciprocal of a response amplitude of a receiver at each frequency point.

15. The method according to claim 9, wherein the measuring the spectrum gap width according to the spectrum information of the received signal further includes:
determining a noise floor power of the input signal, and subtracting the noise floor power at each frequency point of the input signal to obtain a noise eliminated signal and setting the noise eliminated signal as a next input signal of a next step of processing.

16. The method according to claim 9, wherein the method further includes:
receiving reference information transmitted by a neighboring receiver, and adjusting the spectrum gap width according to the reference information.

17. A coherent optical receiver, comprising an apparatus for estimating channel spacing, configured to measure a spectrum gap width according to spectrum information of a received signal, and determine channel spacing by using the spectrum gap width according to a predefined corresponding relationship between the channel spacing and the spectrum gap width,
wherein the apparatus for estimating channel spacing is configured to:
acquire the received signal;
extract the spectrum information from the received signal; and
determine a reference power according to a predefined reference power level, and set a frequency difference between two frequency points in one of a left and right gap of a central channel in the spectrum information of the received signal corresponding to the reference power as the spectrum gap width.

* * * * *